US011755913B2

(12) United States Patent
Francini et al.

(10) Patent No.: US 11,755,913 B2
(45) Date of Patent: Sep. 12, 2023

(54) CONVOLUTIONAL NEURAL NETWORKS, PARTICULARLY FOR IMAGE ANALYSIS

(71) Applicant: TELECOM ITALIA S.p.A, Milan (IT)

(72) Inventors: Gianluca Francini, Turin (IT); Skjalg Lepsoy, Turin (IT); Pedro Porto Buarque De Gusmao, Turin (IT)

(73) Assignee: TELECOM ITALIA S.p.A, Milan (IT)

( * ) Notice: Subject to any disclaimer, the term of this patent is extended or adjusted under 35 U.S.C. 154(b) by 1333 days.

(21) Appl. No.: 16/081,693

(22) PCT Filed: Mar. 11, 2016

(86) PCT No.: PCT/EP2016/055240
§ 371 (c)(1),
(2) Date: Aug. 31, 2018

(87) PCT Pub. No.: WO2017/152990
PCT Pub. Date: Sep. 14, 2017

(65) Prior Publication Data
US 2020/0042871 A1 Feb. 6, 2020

(51) Int. Cl.
*G06N 3/04* (2023.01)
*G06N 3/08* (2023.01)
(Continued)

(52) U.S. Cl.
CPC ........... *G06N 3/084* (2013.01); *G06F 18/214* (2023.01); *G06F 18/217* (2023.01);
(Continued)

(58) Field of Classification Search
CPC ............ G06N 3/08; G06N 3/04; G06N 3/084; G06N 3/0454; G06K 9/6256;
(Continued)

(56) References Cited

U.S. PATENT DOCUMENTS

| 2007/0047802 A1* | 3/2007 | Puri | ....................... G06N 3/063 382/157 |
| 2014/0180986 A1* | 6/2014 | Hinton | ................. G06V 10/454 706/21 |

(Continued)

FOREIGN PATENT DOCUMENTS

WO   WO 2015/083199 A1   6/2015

OTHER PUBLICATIONS

Porto et al. (Fast Training of Convolutional Neural Networks via Kernel Rescaling, published Oct. 2016, pp. 1-14 (Year: 2016).*

(Continued)

*Primary Examiner* — Stephen S Hong
*Assistant Examiner* — Ahamed I Nazar
(74) *Attorney, Agent, or Firm* — Oblon, McClelland, Maier & Neustadt, L.L.P.

(57) ABSTRACT

A method in which a convolutional neural network is configured to receive an input data structure including a group of values corresponding to signal samples and to generate a corresponding classification output indicative of a selected one among plural predefined classes. The convolutional neural network includes an ordered sequence of layers, each configured to receive a corresponding layer input data structure including a group of input values, and generate a corresponding layer output data structure including a group of output values by convolving the layer input data structure with at least one corresponding filter including a corresponding group of weights. The layer input data structure of the first layer of the sequence corresponds to the input data structure. The layer input data structure of a generic layer of the sequence different from the first layer corresponds to the layer output data structure generated by a previous layer in the sequence.

15 Claims, 6 Drawing Sheets

(51) Int. Cl.
G06V 10/764 (2022.01)
G06V 10/82 (2022.01)
G06K 9/00 (2022.01)
G06N 3/084 (2023.01)
G06F 18/214 (2023.01)
G06F 18/21 (2023.01)
G06F 18/2413 (2023.01)
G06V 10/44 (2022.01)

(52) U.S. Cl.
CPC ........... G06F 18/2413 (2023.01); G06N 3/04 (2013.01); G06N 3/08 (2013.01); G06V 10/454 (2022.01); G06V 10/764 (2022.01); G06V 10/82 (2022.01)

(58) Field of Classification Search
CPC ........ G06K 9/6262; G06K 9/627; G06K 9/00; G06V 10/454; G06V 10/764; G06V 10/82
USPC .......................................... 382/157
See application file for complete search history.

(56) References Cited

U.S. PATENT DOCUMENTS

| 2015/0139536 | A1* | 5/2015 | Jin | G06V 10/56 382/156 |
| 2016/0174902 | A1* | 6/2016 | Georgescu | G06V 10/454 600/408 |
| 2016/0328643 | A1* | 11/2016 | Liu | G06N 3/045 |
| 2016/0358070 | A1* | 12/2016 | Brothers | G06N 3/0454 |
| 2016/0379352 | A1* | 12/2016 | Zhang | G06N 3/045 382/157 |
| 2018/0130177 | A1* | 5/2018 | Wang | G06T 3/4007 |
| 2019/0392253 | A1* | 12/2019 | Ji | G06K 9/6267 |

OTHER PUBLICATIONS

International Search Report dated Dec. 8, 2016 in PCT/EP2016/055240 filed Mar. 11, 2016.

Kamnitsas, K. et al., "Multi-Scale 3D Convolutional Neural Networks for Lesion Segmentation in Brain MRI", 4 total pages, XP055240948.

Howard, A. G., "Some Improvements on Deep Convolutional Neural Network Based Image Classification", 6 total pages, XP055324862.

Dong, C. et al., "Accelerating the Super-Resolution Convolutional Neural Network", Springer International Publishing AG, 2016, pp. 391-407, XP047356346.

Song, I. et al., "Deep Learning for Real-Time Robust Facial Expression Recognition on a Smartphone", IEEE International Conference on Consumer Electronics (ICCE), Jan. 10, 2014, pp. 564-567, XP032581909.

Written Opinion of the International Search Authority issued in corresponding European Application PCT/EP2016/055240, 10 pages total.

* cited by examiner

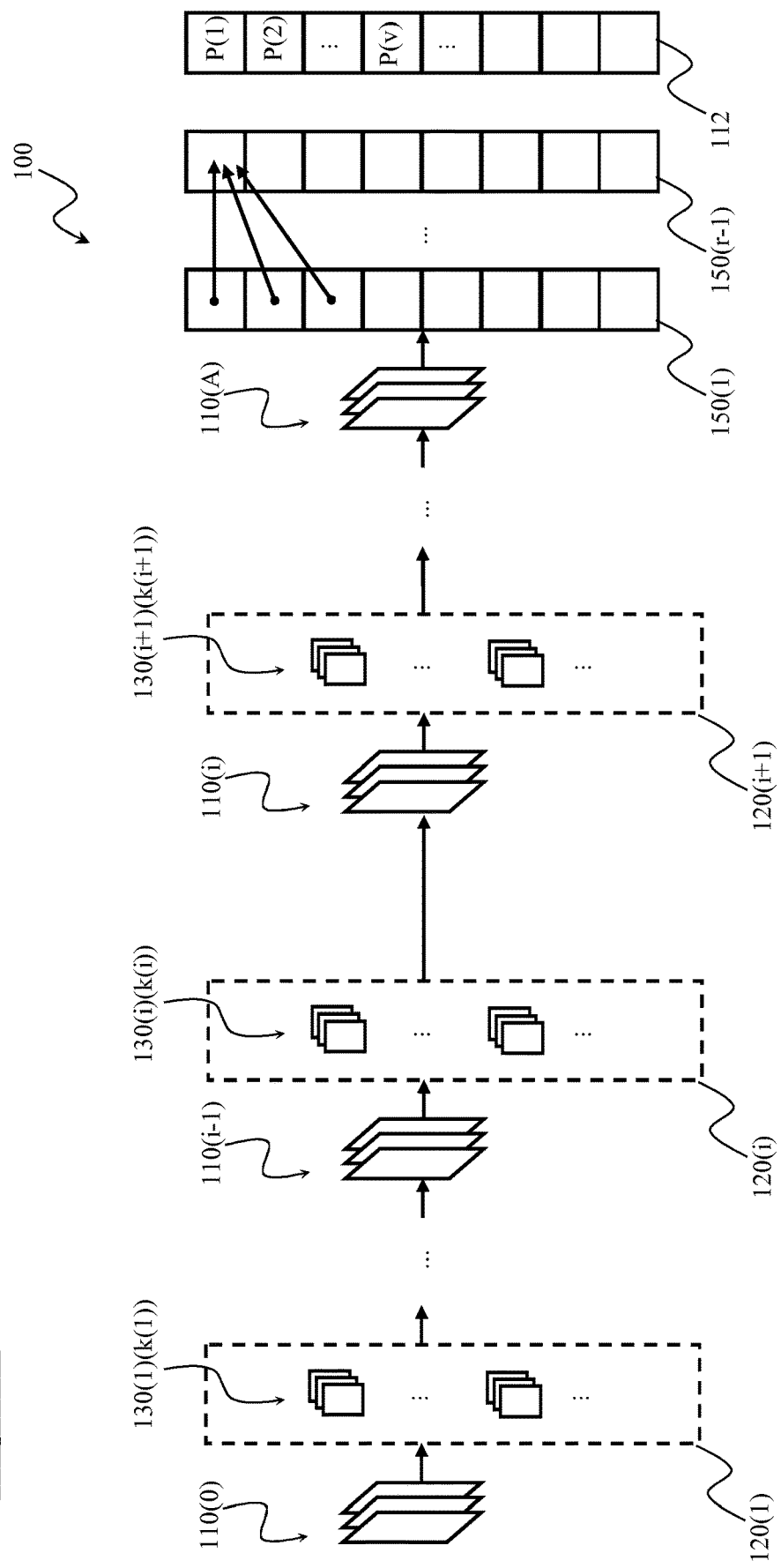

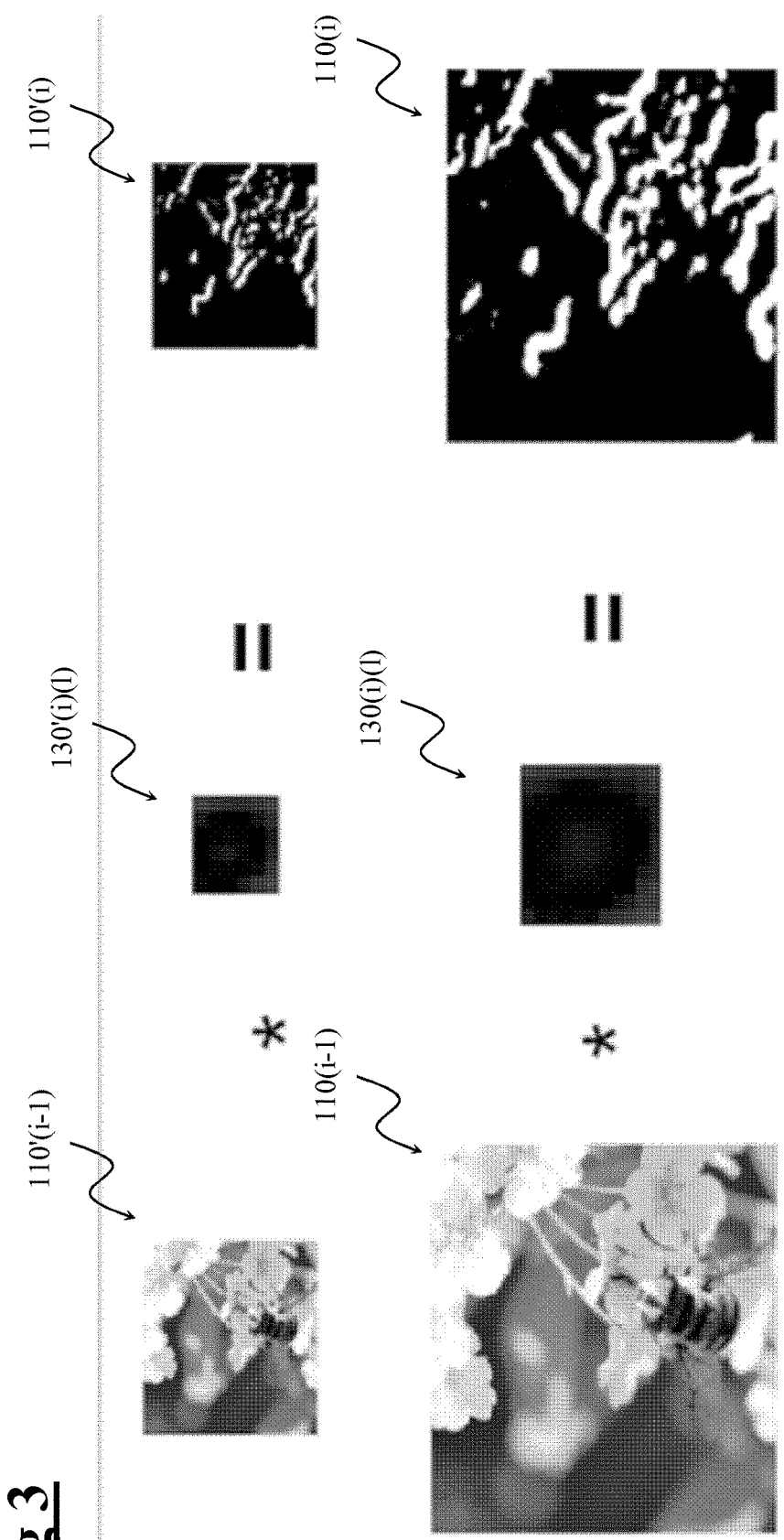

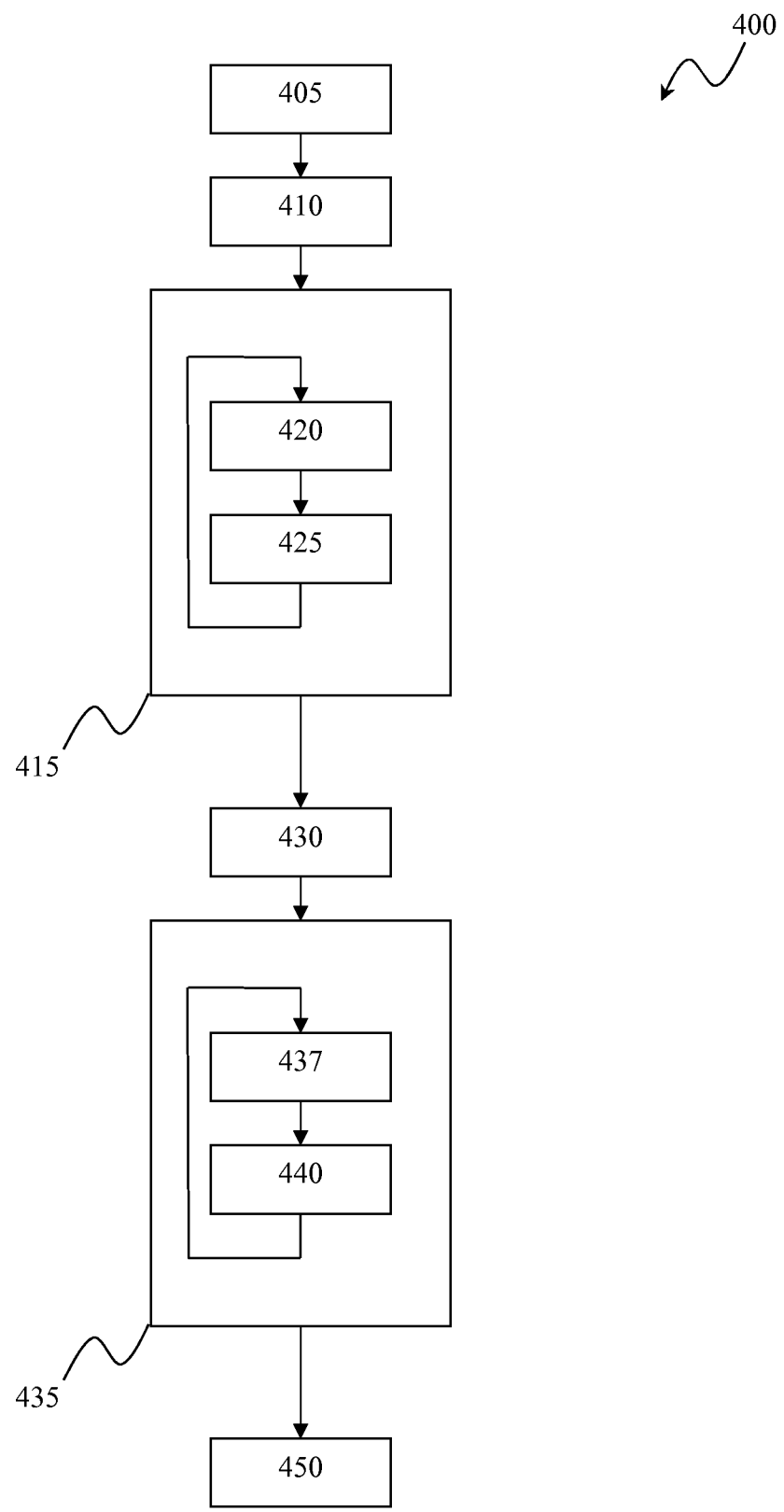

CONVOLUTIONAL NEURAL NETWORKS, PARTICULARLY FOR IMAGE ANALYSIS

BACKGROUND OF THE INVENTION

Field of the Invention

The present invention relates to the field of the image analysis.

DESCRIPTION OF THE RELATED ART

Object classification of images (hereinafter, simply "object classification") has become increasingly important as the use of digital image capture devices—such as smartphones or other portable devices including a digital camera—grows. Object classification is a procedure that provides for assigning labels to object(s) depicted in a (digital) image according to predefined image classes. Object classification provides for selecting an appropriate class for the object depicted in the image among the available predefined image classes by analyzing visual features of the image.

Object classification may be based on the known machine learning approach usually referred to as "deep learning" applied to Artificial Neural Networks (hereinafter, briefly "ANN").

As it is well known to those skilled in the art, the basic element of an ANN is the neuron, also referred to as node. Each neuron has a single output but it might have many inputs. The output of a neuron is the result of applying a non-linear function to a linear combination of its inputs added to a constant value usually known as bias. The coefficients of this linear combination are usually called weights and the non-linear function is usually called activation function. ANN are arranged according to a sequence of so-called "layers". Each layer contains a corresponding set of neurons. The output of a neuron belonging to a layer may serve as an input to a neuron belonging to the next layer of the sequence.

As disclosed for example in *Gradient-based learning applied to document recognition* by LeCun, Yann, et al., Proceedings of the IEEE 86.11 (1998), Convolutional Neural Network (hereinafter, briefly "CNN") is a kind of ANN that is particularly advantageous to be exploited in the object classification field. For this reason, most of the approaches actually employed in the object classification field are based on CNN. A CNN is an ANN comprising at least one convolutional layer, i.e., a layer comprising neurons that share the same set of weights (in the image analysis field, said set of weights is usually referred to as "kernel" or "filter") and whose outputs are given by the convolution among the inputs thereof.

Making reference to an exemplary gray-scale digital image comprising $H^2$ pixels arranged in H rows and H columns (input image), wherein each pixel has associated thereto a corresponding pixel value indicative of a corresponding luminance value (e.g., the higher the pixel value, the higher the luminance), and a kernel comprising $R^2$ weights arranged in a matrix having R×R elements, the convolution between the input image and the kernel provides for generating a processed digital image comprising a plurality of processed pixels, each one associated to a corresponding pixel (source pixel) of the input image, by carrying out for each source pixel of the input image the following operations:

- the kernel is "overlapped" over a corresponding portion of the input image in order to have each pixel of said portion of the input image that is associated with a corresponding element of the kernel matrix, with the source pixel that is associated with the center element of the kernel matrix;
- the pixel value of each pixel included in said portion of the input image is weighted by multiplying it with the weight corresponding to the associated element of the kernel matrix;
- the weighted pixel values are summed to each other and then a corresponding bias is further added to obtain a corresponding new pixel value;
- the pixel value of the processed pixel associated to the source pixel is set to said new pixel value.

Generalizing, the convolutional layer of a CNN having as input a square H×H digital signal (also generally referred to as "input data structure" or simply "input structure") comprising $H^2$ values obtained by sampling such signal (such as the abovementioned $H^2$ pixel values of the exemplary H×H gray-scale digital image), and having a kernel comprising $R^2$ weights arranged in a square matrix having R×R elements, outputs a (H−R+1)×(H−R+1) digital signal (also generally referred to as "output data structure" or simply "output structure") comprising $(H-R+1)^2$ values. As can be read for example in *Fast Training of Convolutional Netorks through FFTs*, by Michael Mathieu, Mikael Henaff, and Y LeCun, International Conference on Learning Representations (ICLR2014), pages 1-9, 2014, the number M of multiplication operations required to obtain said output structure is equal to:

$$M=(H-R+1)^2 R^2 \qquad (1).$$

Similar considerations apply if the input data structure and/or the kernel matrix have a different shape, such as a rectangular shape.

With reference to the considered example, the weights of the R×R kernel may be set to represent a particular visual feature to be searched in the input image. In this case, the output of the convolutional layer is a data structure corresponding to a processed digital image having (H−R+1)×(H−R+1) pixels, wherein each pixel of said processed image may have a pixel value that quantifies how much such particular visual feature is present in the portion of the input image whose central pixel (source pixel) is associated to said pixel of the processed image during the convolution operation (e.g., the higher the pixel value of the processed image, the more such particular visual feature is present in the corresponding portion of the input image). This operation is well known from communication engineering, where it is known as "signal detection using matched filters", see for example *Modern Electrical Communications* by H. Stark and F. B. Tuteur, Chapter 11.6, Prentice-Hall, 1979.

In a typical convolutional layer of a CNN, the input structure may be formed by C equally sized channels. Making for example reference to the object classification field, a colored H×H digital image may be represented through an RGB model by the summation of c=3 different channels: the first channel (R channel) is a digital image having H×H pixels and corresponding to the red component of the colored digital image, the second channel (G channel) is a digital image having H×H pixels and corresponding to the green component of the colored digital image, and the third channel (B channel) is a digital image having H×H pixels and corresponding to the blue component of the colored digital image.

The generic kernel used in a convolutional layer having an input structure formed by C channels is, in turn, formed by C channels. Each channel of the input structure is convolved with a respective channel of the kernel, obtaining thus C convolved channels. The output structure is then obtained by summing such C convolved channels to each other.

Making reference to the abovementioned example, the convolutional layer which receives as input the colored digital image comprising the R, G and B channels exploits a kernel formed in turn by three channels: a first channel formed by a matrix having R×R elements and adapted to be convolved with the R channel of the input image, a second channel formed by a matrix having R×R elements and adapted to be convolved with the G channel of the input image, and a third channel formed by a matrix having R×R elements and adapted to be convolved with the B channel of the input image. Then, the three results of the three convolutions are summed to each other to obtain the output image.

Moreover, a set of C' kernels (each one formed by a number C of channels equal to the number C of channels of the input structure) may be used for a single convolutional layer. In this case, the output structure will comprise in turn C' channels.

Therefore, considering a generic multi-channel scenario, in which the input structure of a convolutional layer comprises c channels and the convolutional layer exploits C' kernels (each one formed by C channels), the number MC of multiplication operations required to obtain the output structure is equal to:

$$MC=C(H-R+1)^2R^2C' \quad (2).$$

As can be read for example in *OverFeat: Integrated Recognition, Localization and Detection using Convolutional Networks*, by Pierre Sermanet, David Eigen, Xiang Zhang, Michael Mathieu, Rob Fergus, and Yann LeCun, arXiv preprint arXiv: 1312.6229, pages 1-15, 2013, an efficient object classification algorithm—i.e., an algorithm capable of classifying objects in correct classes with a low classification error—based on CNN usually comprises several convolutional layers, typically interleaved with subsampling layers (e.g., the so-called max-pooling layers), followed by a sequence of final, fully-connected (i.e., non-convolutional) layers acting as final classifier.

A very important aspect of a CNN regards the way the weights of the kernels of the various convolutional layers are set. The efficiency of an object classification algorithm exploiting a CNN is strictly dependent on the weight values. If the weight values are not correctly set, objects are classified in wrong classes. In order to set the weights of a CNN, the CNN is subjected to a training procedure, such as the so-called backpropagation training procedure disclosed for example at page 153 of *Neural Networks and Learning Machines*, 3/E by Simon Haykin, Prentice Hall (Nov. 18, 2008).

The backpropagation training procedure provides for two main phases: the forward phase and the backward phase.

The forward phase provides for inputting a test image belonging to a known class to the CNN to be trained, and then comparing the corresponding output (which depends on the actual weight values) with the correct known output (i.e., the output corresponding to the correct known class). Since the CNN is not yet trained, the output will be generally different from the correct known output. This difference is reflected by calculating a corresponding error value through an error function.

Given the error value obtained from the forward phase, the backward phase provides for calculating the derivative of the error function with respect to the weights for all the layers recursively from the last layer to the first layer. Once the derivatives are known, weights are updated using a gradient descent operation in order to minimize the error value.

The two abovementioned phases are repeated for a very high amount of times, using a very high number of test images, for example taken from a training database.

The training procedure is a very time consuming process mainly because of the very high number of multiplication operations. Indeed, in a multi-channel scenario the number MC of multiplication operations involved in a single convolutional layer is equal to $C(H-R+1)^2R^2C'$ (see equation (2)).

In the following table, the durations of training procedures exploiting a dataset of images taken by benchmarks listed at https://github.com/soumith/convnet-benchmarks and arranged in 55 epochs each one comprising 10000 mini-batches of 128 images, and using hardware based on a Nvidia GeForce® Titan X card, are shown for different known CNNs.

| CNN type | Duration (hours) |
| --- | --- |
| AlexNet (https://code.google.com/p/cuda-convnet2/source/browse/layers/layers-imagenet-1gpu.cfg) | 52.25 |
| Overfeat-fast (http://arxiv.org/abs/1312.6229) | 134.13 |
| OxfordNet (http://arxiv.org/abs/1409.1556/) | 168.81 |

Paper *Fast Training of Convolutional Networks through FFTs*, by Michael Mathieu, Mikael Henaff, and Y LeCun, International Conference on Learning Representations (ICLR2014), pages 1-9, 2014, discloses a method to speed up the operations performed in convolution layers by using Fast Fourier Transforms (FFT).

SUMMARY OF THE INVENTION

The Applicant has found that the abovementioned known approaches for training CNNs are not efficient, requiring a too high amount of time. Moreover, the solution proposed in Fast Training of Convolutional Networks through FFTs, although capable of reducing the time required to train CNN, is affected by the drawback that it requires an amount of extra memory for managing the FFTs which strongly increases the hardware costs.

In view of the above, Applicant has tackled the problem of providing a CNN training procedure (and a corresponding training system) which is fast and at the same time does not require a huge amount of memory.

Applicant has found that it is possible to directly reduce the number of multiplication operation carried out in a convolutional layer of a CNN by exploiting the spatial scaling property of the convolution operation The spatial scaling property of the convolution operation provides that carrying out the convolution between a first structure and a second structure, and then spatially rescaling (i.e., downscaling or upscaling by a scaling factor) the result of the convolution, produces an output that is proportional to the output obtained by firstly rescaling the first and second structure, then performing the convolution between said rescaled structures, and finally rescaling the result of said latter convolution. The proportionality factor is the squared inverse of the scaling factor. In other words, this property ensures that the visual appearance of the output from a convolution at the downscaled size is the same as the visual appearance of the output from a convolution at the original size, albeit spatially smaller and amplified by the proper factor.

An aspect of the present invention relates to a method. Said method comprises implementing a convolutional neural network in a processing circuit.

Said convolutional neural network is configured to receive an input data structure comprising a group of values corresponding to signal samples and to generate a corresponding classification output indicative of a selected one among a plurality of predefined classes.

Said convolutional neural network comprises an ordered sequence of layers.

Each layer of the sequence is configured to receive a corresponding layer input data structure comprising a group of input values, and generate a corresponding layer output data structure comprising a group of output values by convolving said layer input data structure with at least one corresponding filter comprising a corresponding group of weights.

The layer input data structure of the first layer of the sequence corresponds to said input data structure.

The layer input data structure of a generic layer of the sequence different from the first layer corresponds to the layer output data structure generated by the previous layer in the sequence.

The method further comprises training the convolutional neural network to update the weights of the filters of the layers by exploiting a training set of training input data structures belonging to known predefined classes.

Said training comprises the following phases a), b), c), d):

a) generating a modified convolutional neural network by downscaling, for at least one layer of the sequence of layers of the convolutional neural network, the at least one corresponding filter to obtain a downscaled filter comprising a reduced number of weights;

b) downscaling the training input data structures to obtain corresponding downscaled training input data structures comprising a reduced number of values;

c) for each downscaled training input data structure of at least a subset of the training set, providing such downscaled training input data structure to the modified convolutional neural network to generate a corresponding classification output, and comparing said classification output with the predefined class the training input data structure corresponding to said downscaled training input data structure belongs to;

d) updating the weights of the filters of the layers based on said comparisons.

According to an embodiment of the present invention, said training the convolutional neural network comprises reiterating for a first number of times the sequence of phases c) and d), and then performing the following additional phases e), f), g):

e) generate a further modified convolutional neural network by upscaling the downscaled filters to obtain upscaled filters comprising an increased number of weights;

f) for each training input data structure of at least a subset of the training set, providing such training input data structure to the further modified convolutional neural network to generate a corresponding classification output, and comparing said classification output with the predefined class said training input data structure belongs to;

g) updating the weights of the filters of the layers based on said comparisons.

According to an embodiment of the present invention, said training the convolutional neural network comprises reiterating for a second number of times the sequence of phases f) and g).

According to an embodiment of the present invention, the input data structure, and each training input data structure comprise at least one respective data structure channel.

Each data structure channel comprises a corresponding matrix arrangement of a first number of values.

Each filter of a layer comprises a set of filter channels.

Each filter channel of the set is associated with a corresponding data structure channel of the corresponding layer input data structure.

Each filter channel comprises a corresponding matrix arrangement of a first number of weights.

Said downscaling the at least on filter of a layer to obtain a downscaled filter comprises generating a reduced matrix arrangement of weights comprising a second number of weights lower than the first number of weights.

According to an embodiment of the present invention, said downscaling a training input data structure to obtain a corresponding downscaled training input data structure comprises generating for each data structure channel a reduced matrix arrangement of values comprising a second number of values lower than the first number of values.

According to an embodiment of the present invention, said input data structure and said training input data structures are digital images comprising a plurality of pixels.

Each value of said group of values depends on a corresponding pixel of the plurality.

According to an embodiment of the present invention, the method further comprises, after the convolutional neural network has been trained:

storing the last updated weights in a weight database;

at a user device, sending an input data structure to a classification server;

at the classification server, retrieving the last updated weights from the weight database and setting the convolutional neural network with the retrieved weights;

at the classification server, providing the input data structure received from the user device to the convolutional neural network to obtain a corresponding classification output;

at the classification network, sending the obtained classification output to the user device.

According to an embodiment of the present invention, said convolutional neural network further comprises an further ordered sequence of fully-connected layers.

Each fully-connected layer of the further sequence is configured to receive a corresponding further layer input data structure comprising a group of further input values, and generate a corresponding further layer output data structure comprising a group of further output values.

Each further output value of said further layer output data structure is a function of all the input values of said further layer input data structure.

According to an embodiment of the present invention, at least one layer of the sequence is followed by a corresponding still further layer.

Such still further layer is configured to generate a subsampled version of the layer output data structure generated by said at least one layer.

Another aspect of the present invention provides for a convolutional neural network training system.

The convolutional neural network training system comprises a training device configured to implement a convolutional neural network configured to receive an input data structure comprising a group of values corresponding to signal samples and to generate a corresponding classification output indicative of a selected one among a plurality of predefined classes.

Said convolutional neural network comprises an ordered sequence of layers, each layer of the sequence being configured to receive a corresponding layer input data structure comprising a group of input values, and generate a corresponding layer output data structure comprising a group of output values by convolving said layer input data structure with at least one corresponding filter comprising a corresponding group of weights.

The layer input data structure of the first layer of the sequence corresponds to said input data structure, and the layer input data structure of a generic layer of the sequence different from the first layer corresponds to the layer output data structure generated by the previous layer in the sequence.

The training device is further configured to generate a modified convolutional neural network by downscaling, for at least one layer of the sequence of layers of the convolutional neural network, the at least one corresponding filter to obtain a downscaled filter comprising a reduced number of weights.

The convolutional neural network training system further comprises a training database storing a training set of training input data structures belonging to known predefined classes.

Said training device is further configured to downscale the training input data structures to obtain corresponding downscaled training input data structures comprising a reduced number of values.

The convolutional neural network training system further comprises a calculation device configured to provide, for each downscaled training input data structure of at least a subset of the training set, such downscaled training input data structure to the modified convolutional neural network to generate a corresponding classification output, and comparing said classification output with the predefined class the training input data structure corresponding to said downscaled training input data structure belongs to.

The convolutional neural network training system further comprises a weight database adapted to store the weights of the filters of the layers.

The training device is further configured to update the weights of the filters of the layers stored in the weight database based on said comparisons.

BRIEF DESCRIPTION OF THE DRAWINGS

These and other features and advantages of the present invention will be made evident by the following description of some exemplary and non-limitative embodiments thereof, to be read in conjunction with the attached drawings, wherein:

FIGS. 1A and 1B illustrate a portion of a CNN adapted to be used in an object classification procedure wherein the concepts according to embodiments of the present invention can be applied;

FIG. 3 is a graphic comparison between the convolution obtained from a downscaled input structure and a downscaled kernel and the convolution obtained from original size versions of such input structure and kernel;

FIG. 4 is a flow chart illustrating the main phases of a training procedure directed to set weights of channel(s) kernels of the layers of the CNN of FIG. 1 according to an embodiment of the present invention;

DETAILED DESCRIPTION OF EXEMPLARY EMBODIMENTS OF THE INVENTION

FIG. 1A illustrates a portion of a CNN 100 adapted to be used in an object classification procedure wherein the concepts according to embodiments of the present invention can be applied.

The CNN 100 is configured to receive as input a digital image 110(0) (input image) depicting an object, and to select an appropriate class for the object depicted in the input image 110(0) among a plurality of predefined image classes $IC(v)$ ($v=1, 2, \ldots$), such as for example:

$IC(1)$=person image class;
$IC(2)$=cat image class;
$IC(3)$=dog image class;
$IC(4)$=car image class;
$IC(5)$=house image class,
. . .

For this purpose, the CNN 100 is designed to process the input image 110(0) in order to generate a corresponding classification array 112 which provides an indication about a selected image class $IC(v)$ among the available predefined ones. For example, the classification array may comprise for each one of the predefined image classes $IC(v)$ a corresponding image class probability value $P(v)$ providing the probability that the input image 110(0) depicts an object belonging to that image classes $IC(v)$.

The input image 110(0) is a RGB digital image having H×H pixels (e.g., H may be equal to 112) and comprising $C(0)=3$ channels 110(0)(k(0)) (k(0)=1, 2, 3): the first channel 110(0)(1) is a digital image having H×H pixels and corresponding to the red component of the input image 110(0), the second channel 110(0)(2) is a digital image having H×H pixels and corresponding to the green component of the input image 110(0), and the third channel 110(0)(3) is a digital image having H×H pixels and corresponding to the blue component of the input image 110(0). However, similar considerations apply if the input image 110(0) has a different resolution (i.e., it includes a different number of pixels) and/or if it comprises a different number of channels 110(0)(k(0)) (such as a single channel 110(0)(1) in case of a gray-scale input image 110(0)). On this regard, even if reference has been made to a square input image, similar considerations apply in case the input image has a different shape, such as a rectangular shape.

Figure 1B:
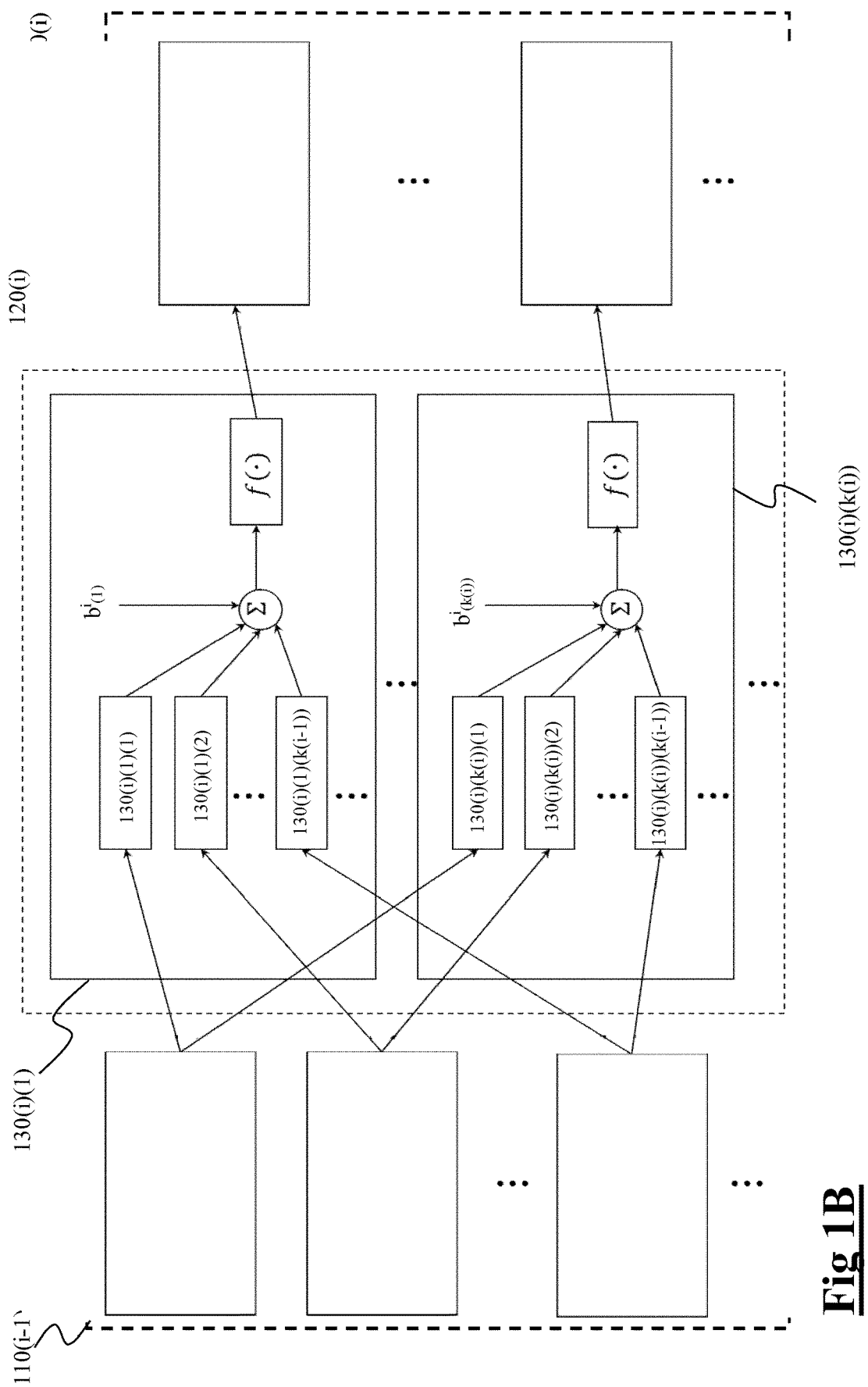

The CNN 100 comprises an ordered sequence of A layers 120(i) (i=1, 2, . . . A), with the generic layer 120(i) of the sequence (that is illustrated in FIG. 1B) which is configured to:

receive from the previous layer $120(i-1)$ of the sequence a corresponding input structure $110(i-1)$ having $C(i-1)$ channels $110(i-1)(k(i-1))$ $(k(i-1)=1, 2, \ldots, C(i-1))$ each one comprising a corresponding set of $H(i-1;k(i-1))\times H(i-1; k(i-1))$ pixels;

process said received input structure $110(i-1)$ by exploiting a corresponding set of $G(i)$ kernels $130(i)(k(i))$ $(k(i)=1, 2, \ldots, G(i))$, each one having $C(i-1)$ channels $130(i)(k(i))(k(i-1))$ $(k(i-1)=1, 2, \ldots, C(i-1))$, wherein each channel $130(i)(k(i))(k(i-1))$ comprises a corresponding set of $R(i;k(i);k(i-1))\times R(i;k(i);k(i-1))$ weights $w_{k(i)k(i-1)}{}^i$ and generate a corresponding output structure $110(i)$ having $C(i)=G(i)$ channels $110(i)(k(i))$ $(k(i)=1, 2, \ldots, C(i))$ each one comprising a corresponding set of $H(i;k(i))\times H(i; k(i))$ pixels.

The first layer $120(1)$ of the CNN is configured to receive as input structure the input image $110(0)$.

Each layer $120(i)$ of the sequence is a convolutional layer configured to carry out a convolution procedure for generating a channel $110(i)(k(i))$ $(k(i)=1$ to $C(i))$ of the output structure $110(i)$ from the received input structure $110(i-1)$ using the kernel $130(i)(k(i))$ according to the following equation:

$$x_{k(i)}{}^i = f(b_{k(i)}{}^i + \Sigma_{k(i-1)=1}^{C(i-1)}(w_{k(i)k(i-1)}{}^i * x_{k(i-1)}{}^{i-1})), \quad (3)$$

wherein $x_k(l)$ is a $H(i,k(i))\times H(i,k(i))$ matrix whose elements $x_{k(i)}{}^i[m, n]$ $(m, n=1$ to $H(i;k(i)))$ are the values of the pixels of the channel $110(i)(k(i))$ of the output structure $110(i)$, $x_{k(i-1)}{}^{i-1}$ is a $H(i-1;k(i-1))\times H(i-1; k(i-1))$ matrix whose elements $x_{k(i-1)}{}^{i-1}[m, n]$ $(m, n=1$ to $H(i-1;k(i-1)))$ are the values of the pixels of the channel $110(i-1)(k(i-1))$ of the input structure $110(i-1)$, $w_{k(i)k(i-1)}{}^i$ is a $R(i;k(i);k(i-1))\times R(i; k(i);k(i-1))$ matrix whose elements $w_{k(i)k(i-1)}{}^i[u,t]$ $(u, t=1$ to $R(i;k(i);k(i-1)))$ correspond to the weights $w(i)(k(i)k(i-1))$ of the channel $130(i)(k(i))(k(i-1))$ of the kernel $130(i)(k(i))$, $b_{k(i)}{}^i$ is a bias value corresponding to the kernel $130(i)(k(i))$, $f)$ is the activation function of the layer $120(i)$ (for example, a non-linear function, such as sigmoid, rectified linear units, hyperbolic tangent), and wherein the generic element $[m,n]$ of the convolution $w_{k(i)k(i-1)}{}^i * x_{k(i-1)}{}^{i-1}$ is obtained according to the following equation:

$$(w_{k(i)k(i-1)}^j * x_{k(i-1)}^{j-1})[m, n] = \sum_{u=1}^{R}\sum_{t=1}^{R}\left((w_{k(i)k(i-1)}^j[u, t])\cdot\left(x_{k(i-1)}^{j-1}\left[m-u+\frac{R+1}{2}, n-t+\frac{R+1}{2}\right]\right)\right). \quad (4)$$

The weights $w(i)(k(i))(k(i-1))$ represent a particular visual feature to be searched in the channel $110(i-1)(k(i-1))$ of the input structure $110(i-1)$. Each pixel of the channel $110(i)(k(i))$ of the output structure $110(i)$ quantifies how much such particular visual feature is present in a portion of the channel $110(i-1)(k(i-1))$ of the input structure $110(i-1)$ whose central pixel is associated to the pixel $x_{k(i)}[m, n]$ during the convolution procedure.

Some of the convolutional layers $120(i)$ of the sequence may be followed by a corresponding max-pooling layer (not illustrated), which is configured to carry out a subsampling procedure directed to generate a subsampled version of the structure $110(i)$ received from the convolutional layer $120(i)$. The subsampling procedure provides for spanning a movable selection window over the channels $110(i)(k(i))$ of the structure $110(i)$ in order to select corresponding sets of pixels and generating for each selected set of pixels a corresponding pixel corresponding to the pixel having the highest pixel value among the ones of the selected set of pixels. Purpose of this subsampling procedure is to allow for some degree of translation invariance and to reduce the computational requirements for the following layers $120(i)$ of the sequence. Similar considerations apply if the subsampling procedure is carried out in a different way, such as for example by calculating the average among the values of the selected set of pixels.

The CNN $100$ further comprises r additional layers $150(q)$ $(q=1$, to $r)$ of the fully-connected type, i.e., non convolutional layers designed to generate output structures from input structures wherein each output value of the output structure is a function of all the input values of the input structure. The additional layers $150(q)$ act as final classifiers having a number of output neurons equal to the number of possible predefined image classes $IC(v)$, so that each output neuron is associated to a specific one among the predefined image classes $IC(v)$.

The first additional layer $150(1)$ is designed to receive as input structure the output structure $110(A)$ generated by the last layer $120(A)$, while the last additional layer $150(q=r)$ is designed to generate as output structure the classification array $112$. The classification array $112$ shows for each one of the predefined image classes $IC(v)$ a corresponding image class probability value $P(v)$ providing the probability that the input image $110(0)$ depicts an object belonging to that image classes $IC(v)$.

As already mentioned in the introduction, the efficiency of an object classification algorithm exploiting a CNN, such as the CNN $100$, is strictly dependent on the weight values. In order to set the weights of a CNN, the CNN is subjected to a backpropagation training procedure providing for the repetition of two main phases: the forward phase and the backward phase. The two abovementioned phases are repeated for a high number of input images $110(0)$ taken from a training dataset, e.g., stored in a training database, belonging to known image classes $IC(v)$. For example, the training dataset may comprise a million of images $110(0)$ and $1000$ image classes $IC(v)$, e.g., with $1000$ images $110(0)$ for each one of said $1000$ image classes $IC(v)$.

The forward phase provides for inputting an input image $110(0)$ taken from a training dataset, e.g., stored in a training database, belonging to a known image class $IC(v)$ to the CNN $100$, and then comparing the corresponding classification array $112$ (which depends on the actual weight values) outputted by the CNN $100$ with a target classification array $112*$ having the image class probability value $P(v)$ corresponding to the known image class $IC(v)$ equal to $1$, while the other image class probability values $P(v)$ are equal to $0$.

The classification array $112$ is then subtracted from the target classification array $112*$ to obtain a corresponding error array $e$, which is passed in turn to an error function $E(e)$ that outputs a single scalar measure of such error. For example, $E(e)=e^T e$.

Once the error value $E(e)$ is obtained, the necessary partial derivatives are generated during the backward phase as follows. By referring to $w_{k(i)k(i-1)}{}^i$ as being the matrix structure containing the weights of the generic structure $130(i)(k(i))(k(i-1))$ and $b_{(k_i)}{}^i$ as being the bias value for that same structure, it is possible to obtain the derivatives of the error function $E(e)$ with respect to both $w_{k(i)k(i-1)}{}^i$ and $b_{(k_i)}{}^i$, i.e.

$$\frac{\partial E}{\partial (w_{k(i)k(i-1)}^j)} \text{ and } \frac{\partial E}{\partial (b_{(k_j)}^j)},$$

for all the layers 120(*i*) and 150(*q*) recursively from the last layer to the first.

Once these derivatives are known, weights can be updated using a gradient descent procedure, according to the following equation:

$$w_{k(i)k(i-1)}^{i*} = w_{k(i)k(i-1)}^{i} - \eta \frac{\partial E}{\partial(w_{k(i)k(i-1)}^{i})}, \quad (5)$$

$$b_{(k_i)}^{i*} = b_{(k_i)}^{i} - \eta \frac{\partial E}{\partial(b_{(k_i)}^{i})}, \quad (6)$$

wherein $w_{k(i)k(i-1)}^{i*}$ is the matrix whose elements are the updated weights of $w_{k(i)k(i-1)}^{i}$, $b_{(k_i)}^{i*}$ is the updated bias of $b_{(k_i)}^{i}$, and $\eta$ is a parameter called "learning rate".

The updating of the weights according to equations (5) and (6) can be done immediately after each backpropagation phase, i.e., each time a new input image 110(0) of the training dataset is input to the CNN 100. This typology of updating is referred to as Online Gradient Descent or Stochastic Gradient Descent.

Alternatively, the updating of the weights and bias according to equation (5) and (6) may be done by first applying the forward and backward phases to all the input images 110(0) of the training dataset to produce and average the derivatives $$\frac{\partial E}{\partial(w_{k(i)k(i-1)}^{i})} \text{ and } \frac{\partial E}{\partial(b_{(k_i)}^{i})}$$

before updating the weights. This typology of updating procedure is referred to as Batch Gradient Descent.

An intermediate alternative is also contemplated, wherein the updating of the weights according to equations (5) and (6) is carried out each time a subset (referred to as minibatch) comprising a fixed number of input images 110(0) of the training dataset is subjected to the forward and backward phases. This typology of updating procedure is referred to as Mini-Batch Learning.

In this context, with the term "epoch" it is meant the number of times the entire training dataset is spanned, i.e., the number of times all the input images 100(0) of the training dataset are provided to the input of the CNN 100, during the training procedure. In order to make the CNN 100 to converge toward an error function E(e) minimum, tens of epochs may be required.

The learning rate parameter $\eta$ used in equations (5) and (6) determine how much the weights should change in the direction of the gradient. Therefore, the higher the learning rate parameter $\eta$ value, the faster the advance toward the error function E(e) minimum. However, the learning rate parameter $\eta$ value should be decreased after some initial epochs since high values of t prevent the fine-tuning of the weights, increasing the possibility to pass over the error function E(e) minimum.

Figure 2B:
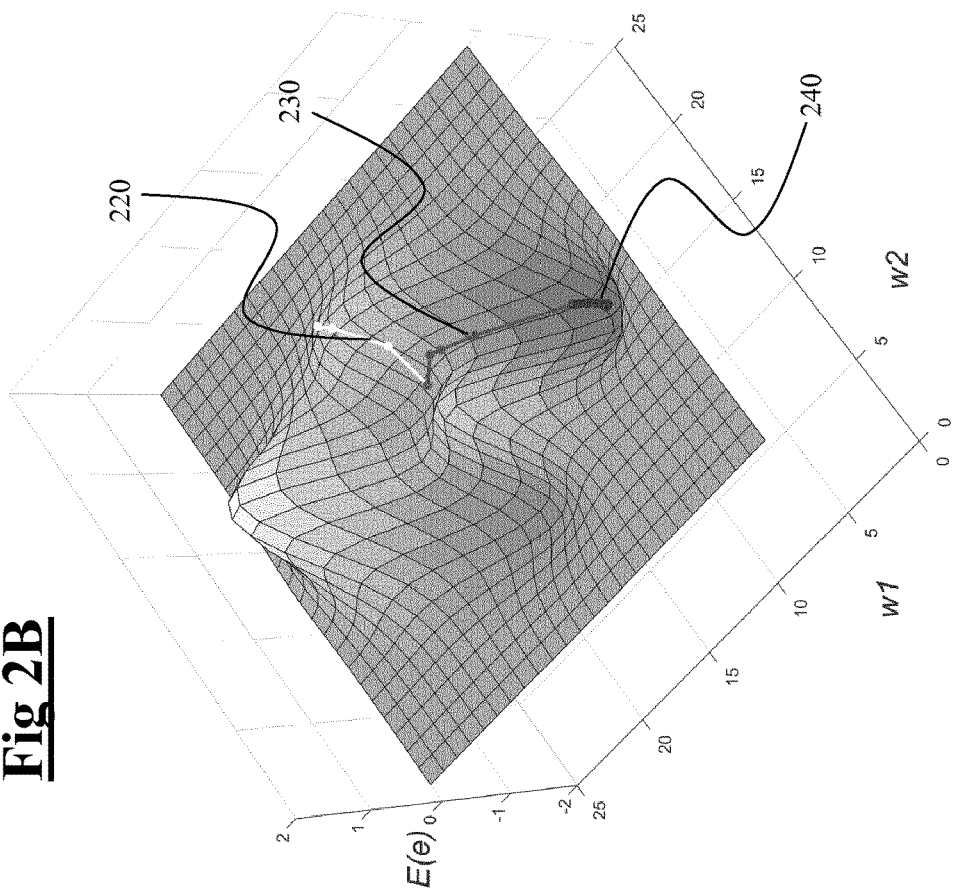
FIG. 2B illustrates the evolution in time of the same error function of FIG. 2A as a function of two weights during a training procedure using a variable learning rate parameter η value.
Figure 2A:
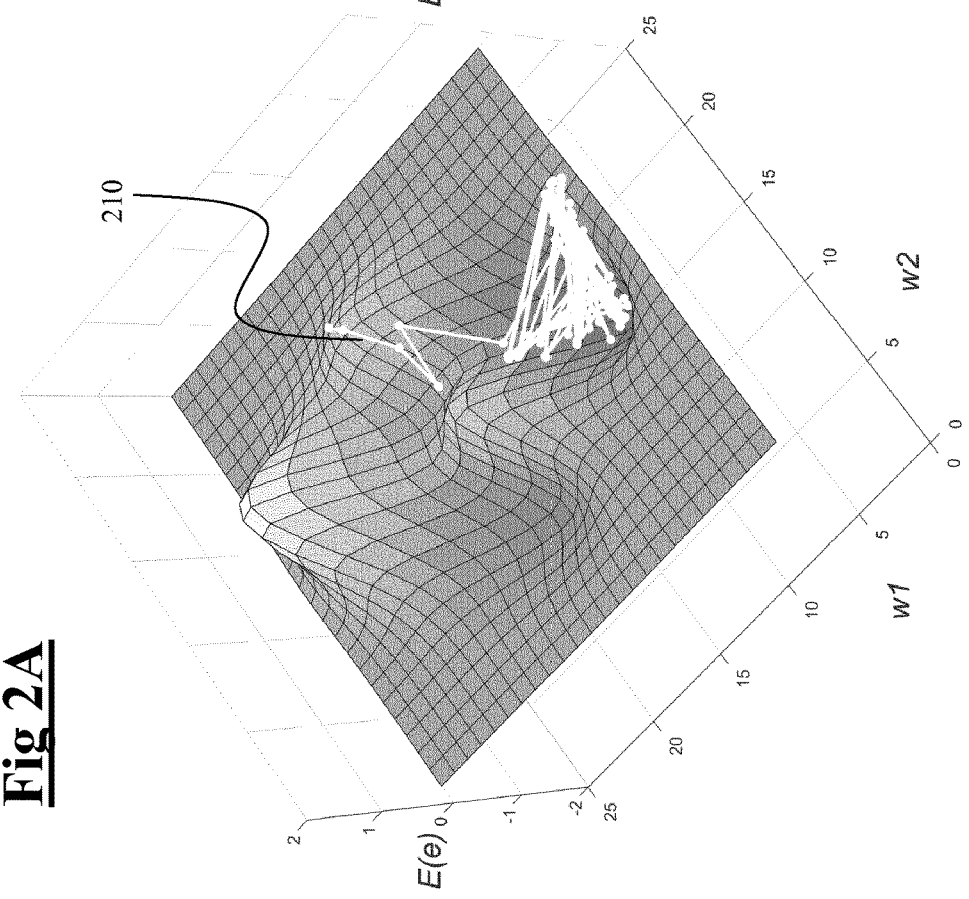
FIG. 2A illustrates the evolution in time of an exemplary error function as a function of two weights during a training procedure using a constant learning rate parameter η value.

In order to show the differences between a constant learning rate parameter $\eta$ value and a variable one, reference will be now made to FIGS. 2A and 2B which illustrate a same exemplary error function E(e) as a function of two weights w1 and w2.

FIG. 2A corresponds to a case in which the learning rate parameter $\eta$ value is kept constant for each epoch of the training procedure. The values assumed by such exemplary error function E(e) during the epochs of the training procedure define a path identified in FIG. 2A with reference 210. As can be observed in FIG. 2A, keeping the learning rate parameter $\eta$ to a constant high value for all the epochs may cause the path to "bounce between the walls" of an error function E(e) minimum, without being capable of reaching the bottom thereof.

FIG. 2B corresponds to the case in which learning rate parameter $\eta$ value is reduced three times during the training procedure. The values assumed by such exemplary error function E(e) during a first set of epochs of the training procedure in which the learning rate parameter $\eta$ is set to a first value define a first path portion identified in FIG. 2B with reference 220. The values assumed by such exemplary error function E(e) during a following second set of epochs of the training procedure in which the learning rate parameter $\eta$ is set to a second value lower than the first value define a second path portion identified in FIG. 2B with reference 230. The values assumed by such exemplary error function E(e) during a following third set of epochs of the training procedure in which the learning rate parameter $\eta$ is set to a third value lower than the second value define a third path portion identified in FIG. 2B with reference 240. As can be observed in FIG. 2B, reducing the learning rate parameter $\eta$ after a number of epochs may drive the path to enter within an error function E(e) minimum, being capable of reaching the bottom thereof.

As already mentioned in the introduction, the number M of multiplication operations required to perform the convolution between a H×H input structure and a R×R kernel is equal to $(H-R+1)^2 R^2$ (see equation (1)). Moreover, the number MC of multiplication operations carried out in a layer 120(*i*) to obtain an output structure 110(*i*) from a H×H input structure 110(*i*−1)—having C channels—using a number C' of R×R kernels is equal to $C(H-R+1)^2 R^2 C'$ (see equation (2)).

In very general terms, the solution according to an embodiment of the present invention provides to reduce the number MC of multiplication operations carried out in a convolutional layer 120(*i*) (see equation (2)) by exploiting the spatial scaling (also known as time scaling) property of the convolution operation disclosed for example at page 43 of *Analog and Digital Signals and Systems* by R. K. Rao Yarlagadda, Springer Science & Business Media, 2010. According to this property, having a first signal defining a first structure A(x,y), a second signal defining a second structure B(x,y), and a third signal defining a third structure C(x,y) equal to the convolution between the former two signals—all the three signals being dependent on variables x and y—the following relationship is verified (s being a scaling factor):

$$\text{If: } A(x, y) * B(x, y) = C(x, y), \quad (7)$$

$$\text{and: } s \neq 0, \quad (8)$$

$$\text{then: } A(sx, sy) * B(sx, sy) = \frac{1}{s^2} C(sx, sy). \quad (9)$$

Making reference to the CNN 100, and having a channel 110(*i*)(k(i)) of an output structure 110(*i*) which is generated in a convolutional layer 120(*i*) by convolving a channel 110(*i*−1)(k(i−1)) of an H×H input structure 110(*i*−1) with a channel 130(*i*)(k(i))(k(i−1)) of a R×R kernel 130(*i*)(k(i)), according to the above relationship, the channel 110(*i*)(k(i)) of a downscaled version—by a scaling factor s—of the output structure 110(*i*) (identified as 110'(*i*)) may be also generated by carrying out the convolution between the channel $110(i-1)(k(i-1))$ of a $(h/s) \times (h/s)$ downscaled version of the input structure $110(i-1)$ (identified as $110'(i-1)$) with the channel $130(i)(k(i))(k(i-1))$ of a $(k/s) \times (k/s)$ downscaled version of the kernel $130(i)(i-1)$ (identified as $130'(i)(i-1)$). In the present description, with "downscaling" a structure comprising a number of elements it is intended generating a downscaled version of such structure which comprises a reduced number of elements and has an information content such to obtain an approximation of the information content of the starting structure if the downscaled version is subjected to an opposite upscaling operation. Similarly, with "downscaling" a kernel comprising a number of weights it is intended generating a downscaled version of such kernel which comprises a reduced number of weights and has an information content such to obtain an approximation of the information content of the starting kernel if the downscaled version is subjected to an opposite upscaling operation.

This is graphically illustrated in FIG. 3. The downscaled versions of the input structure $110'(i-1)$ and of the kernel $130'(i)(k(i))$ may for example be obtained through downsampling of the original size input structure $110(i-1)$ and kernel $130(i)(k(i))$, as well as through bilinear or bicubic interpolation.

As expressed in equations (7)-(9), the spatial scaling property of the convolution operation provides that carrying out the convolution between a first structure and a second structure, and then spatially rescaling (i.e., downscaling or upscaling by a scaling factor) the result of the convolution, produces an output that is proportional to the output obtained by firstly rescaling the first and second structure, then performing the convolution between said rescaled structures, and finally rescaling the result of said latter convolution. The proportionality factor is the squared inverse of the scaling factor.

In other words, this property ensures that the visual appearance of the output from a convolution at the downscaled size is the same as the visual appearance of the output from a convolution at the original size, albeit spatially smaller and amplified by the proper factor.

Therefore, applying relationships (7)-(9) to equation (1), the number M' of multiplication operations required to obtain the channel $110(i)(k(i))$ of such downscaled output structure $110'(i)$ is equal to:

$$M' = \left(\frac{H}{s} - \frac{R}{s} + 1\right)^2 \left(\frac{R}{s}\right)^2 \approx \frac{M}{s^4}. \quad (10)$$

In other words, the number M' of multiplication operations required to obtain the channel $110(i)(k(i))$ of a downscaled version $110'(i)$ of an output structure $110(i)$ can be reduced by about the fourth power of the scaling factor s.

However, employing downscaled structures and kernels for carrying out convolution operations during all the epochs of the training procedure may potentially degrade the performance of the object classification due to loss in resolution.

For this purpose, according to an embodiment of the present invention, the training procedure of the CNN 100 is carried out by initially reiterating for a first number NE1 of epochs (pre-training sub-procedure) the forward and backward phases for each layer $120(i)$ with downscaled versions of input structures $110'(i-1)$, output structures $110'(i-1)$ and kernels $130'(i)(k(i))$, then upscaling the structures and the kernels, and finally reiterating for a second number NE2 of epochs (main-training sub-procedure) the forward and backward phases with such upscaled versions.

This is particularly advantageous since employing downscaled structures and kernels for carrying out convolution operations only during an initial set of epochs allows to strongly reduce the number of multiplication operations by exploiting lower resolutions only during a first initial portion of the training procedure (pre-training sub-procedure) in which kernels still have not taken a precise shape, e.g., during a portion of the training procedure in which reducing the resolution does not effectively hinder the performances of the object classification.

FIG. 4 is a flow chart 400 illustrating the main phases of a training procedure directed to set the weights of channel(s) kernels of the layers of the CNN 100 according to an embodiment of the present invention. The flow chart 400 will be described by making reference to the weights of channels $130(i)(k(i))(k(i-1))$ of kernels $130(i)(k(i))$ used in generic convolutional layers $120(i)$ of the CNN 100, however similar considerations apply to weights of different layers of the CNN 110, such as the fully-connected additional layers $150(q)$. The phases of the training procedure may be implemented in form of software or firmware modules comprising instructions adapted to be loaded and executed by one or more processing devices included in one or more processing circuits such as the training server 500 illustrated in FIG. 5.

The first phase of the training procedure (block 405 of FIG. 4) provides for setting the scaling factor s to be used for downscaling the channels $130(i)(k(i))(k(i-1))$ of kernels $130(i)(k(i))$ and the channels $110(i)(k(i))$ of the corresponding output structures $110(i)$ during the pre-training sub-procedure. This is carried out by a corresponding training device 510 of the training server 500. Each layer $120(i)$ may have a different scaling factor s. According to an embodiment of the present invention, the training device 510 is configured to set the scaling factor s by taking into account the two following considerations:

the higher the scaling factor s, the lower the number of multiplication operations M' required to calculate the convolutions;

the size of the kernel $130(i)(k(i))$ used in the pre-training sub-procedure should be large enough to capture spatial patterns needed in the following main-training sub-procedure.

The following table provides exemplary scaling factors s for various original R×R kernel according to an embodiment of the present invention.

| Original kernel size (R × R) | Downscaled kernel size (R/s × R/s) | Scaling factor (s) |
|---|---|---|
| 11 × 11 | 7 × 7 | 11/7 |
| 7 × 7 | 5 × 5 | 7/5 |
| 5 × 5 | 3 × 3 | 5/3 |
| 3 × 3 | 2 × 2 | 3/2 |

In the next phase of the training procedure (block 410 of FIG. 4) the training device 510 provides for implementing the CNN 100. This is done by adapting the structures $110(i)$ used by the various layers $120(i)$ by generating the corresponding downscaled versions $110'(i)$ according to the scaling factors s selected for each corresponding kernel $130(i)(k(i))$. For each convolutional layer $120(i)$, the scaling factor s should also be approximately equal to the ratio between the original size of the input structure $110(i)$ and the size of the downscaled version 110'(i) thereof. For example, according to an embodiment of the present invention, this can be accomplished by resizing the input structures 110(i) to the desired ratio and by including or removing zero-paddings.

At this point, the CNN 100 is subjected to the abovementioned pre-training sub-procedure exploiting the downscaled versions of the structures 110'(i) and of the kernels 130(i)(k(i)) (block 415 of FIG. 4). Said pre-training sub-procedure is carried out exploiting a corresponding calculation device 520 of the training server 500, such as a Graphics Processing Unit (GPU) or a stream processor unit-like such as a General Purpose Graphics Processing Unit (GPGPU). As described previously, the pre-training sub-procedure provides for reiterating for a first number of epochs NE1 the forward phase (block 420 of FIG. 4) and the backward phase (block 425 of FIG. 4) exploiting downscaled versions of input images 110'(0) taken from a training dataset stored in a training database 530. The first number of epochs NE1 is set by taking into account features of the dataset. For example, NE1 may be equal to 20.

Once the pre-training sub-procedure is terminated, the training device 510 upscales the downscaled kernels 130'(i)(k(i)) before initiating the subsequent main-training sub-procedure (block 430 of FIG. 4). According to an embodiment of the present invention, this can be done through interpolation techniques (such as bilinear, bicubic, spline, and so on) applied to each channels 130(i)(k(i))(k(i−1)) of the downscaled kernels 130'(i)(k(i)). Moreover, in order to take into account for the amplitude scaling effect given by relationship (9), the amplitude of each weight of the upscaled kernels 130(i)(k(i)) must be divided by $s^2$.

At this point, the CNN 100 is subjected to the main-training sub-procedure exploiting the upscaled versions of the structures 110(i) and of the kernels 130(i)(k(i)) (block 435 of FIG. 4). The main-training sub-procedure exploiting is carried out by the calculation device 520 of the training server 500. As described previously, the main-training sub-procedure provides for reiterating for a second number of epochs NE2 the forward phase (block 437 of FIG. 4) and the backward phase (block 440 of FIG. 4) exploiting the input images 110(0) taken from the same training dataset used for the pre-training sub-procedure. Again, the second number of epochs NE2 is set by taking into account features of the dataset. For example, NE2 may be equal to 60.

The weights w(i)(k(i))(k(i−1)) obtained at the end of the main-training sub-procedure are then stored in a corresponding weight database 540 (block 450 of FIG. 4).

Figure 6:
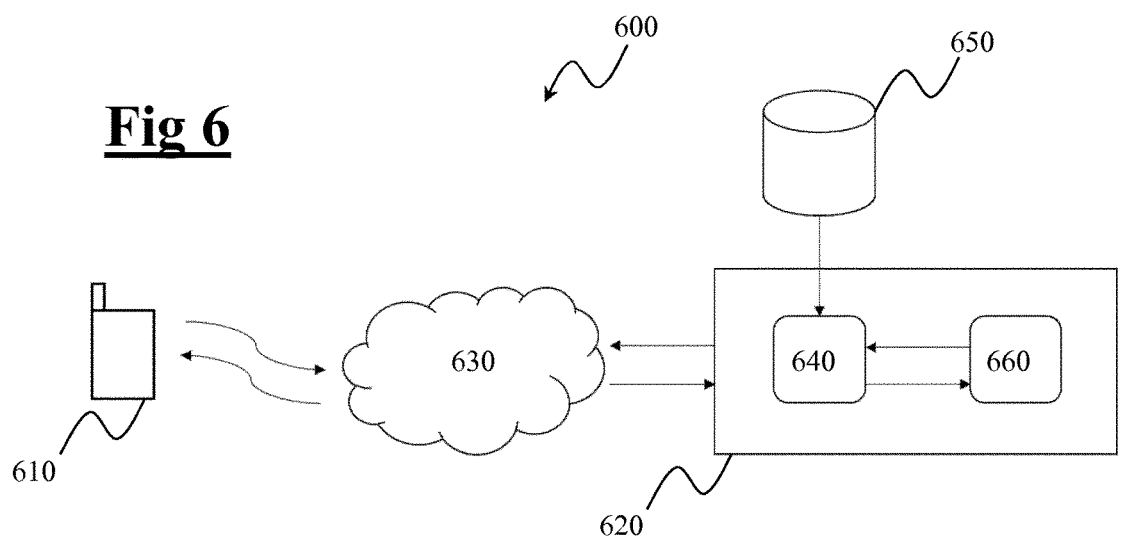
FIG. 6 illustrates an exemplary scenario showing how a CNN trained with the training procedure according to an embodiment of the present invention can be used for classifying a digital image.

Making reference to FIG. 6, an exemplary scenario 600 is now described showing how a CNN trained with the training procedure according to an embodiment of the present invention can be used for classifying a digital image.

A user takes a picture of a subject, e.g., a dog, with a user device 610 equipped with a camera, such as a smartphone. Then, a digital image (input image 110(0)) corresponding to the picture is sent to a classification server 620, for example through a network 630 such as the Internet.

Figure 5:
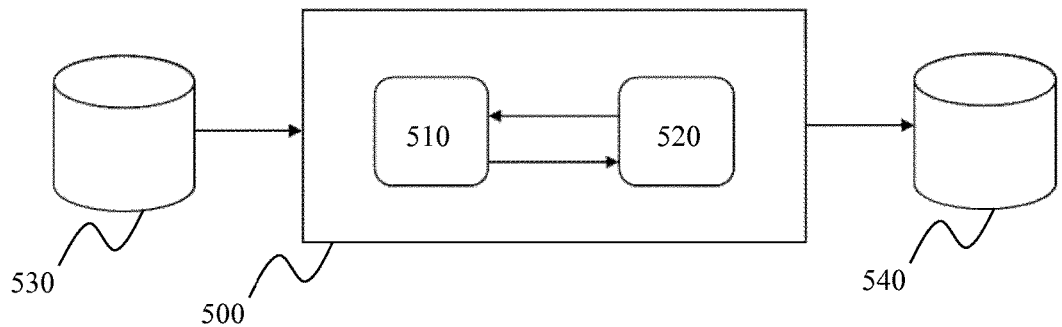
FIG. 5 illustrates a training server adapted to implement the method illustrated in FIG. 4.

The classification server 620 comprises a classification device 640 configured to implement a CNN by exploiting weights stored in a weight database 650 which stores weights obtained after a training procedure according to an embodiment of the procedure (for example, a copy of the weights stored in the weight database 540 of FIG. 5). The classification server 620 further comprises a calculation device 660, such as a GPU or a GPGPU configured to carry out the calculation required for processing the input image 110(0) with the CNN. The classification server 620 is configured to send to the user device 610 a classification array 112 providing for each one of a group of predefined image classes IC(v) a corresponding image class probability value P(v) providing the probability that the input image 110(0) depicts an object belonging to that image classes IC(v).

Figure 7:
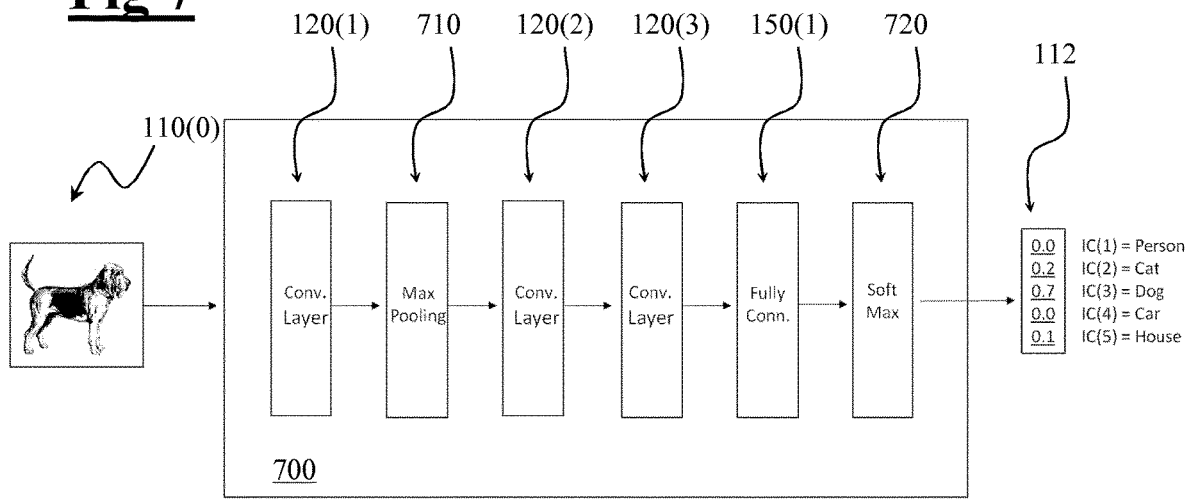
FIG. 7 illustrates an exemplary CNN used in the scenario of FIG. 6.

In the considered example, the CNN implemented by the classification device 640 is a very simple CNN, illustrated in FIG. 7 with reference 700, comprising the following sequence of components:
  a first convolutional layer 120(1);
  a max-pooling layer 710;
  a second convolutional layer 120(2);
  a third convolutional layer 120(3);
  a fully connected layer 150(1), and
  a soft max layer 720.

The soft max layer is directed to carry out normalization operations on the image class probability values P(v) of the classification array 112 in such a way that their sum is equal to 1.

The classification server 640 is configured to process the received input image 110(0) using the CNN 700—configured with the weights taken from the weight database 650—to generate a corresponding classification array 112. In the considered example, the classification array 112 has five elements, corresponding to the following image classes:
  IC(1)=person image class;
  IC(2)=cat image class;
  IC(3)=dog image class;
  IC(4)=car image class;
  IC(5)=house image class The highest image class probability value P(v) of the classification array 112 illustrated in FIG. 7 is the one corresponding the image class IC(3), since the picture taken with the user device 610 is the picture of a dog.

In order to provide an example on how training a CNN with a pre-training sub-procedure exploiting downscaled structures and kernels, reference will be now made to the following two tables, wherein the first one describes a CNN in its original size and the second one describes a downscaled version thereof. The exemplary CNN is an Overfeat-fast CNN comprising five convolutional layers 120(i) (i=1 to 5) followed by three fully-connected additional layers 150 (q) (q=1 to 3), with each one among the convolutional layers 120(1), 120(2), 120(5) that is followed by a corresponding max-pooling layer.

| | Original Size CNN | | | | | | | |
|---|---|---|---|---|---|---|---|---|
| layer | 120(1) | 120(2) | 120(3) | 120(4) | 120(5) | 150(1) | 150(2) | 150(3) |
| type | Conv + max-p | Conv + max-p | Conv | Conv | Conv + max-p | Fully-conn | Fully-conn | Fully-conn |
| output channels | 96 | 256 | 512 | 1024 | 1024 | 3072 | 4096 | 1000 |

-continued

| Original Size CNN | | | | | | | | |
|---|---|---|---|---|---|---|---|---|
| layer | 120(1) | 120(2) | 120(3) | 120(4) | 120(5) | 150(1) | 150(2) | 150(3) |
| kernel size | 11 × 11 | 5 × 5 | 3 × 3 | 3 × 3 | 3 × 3 | — | — | — |
| conv stride | 4 × 4 | 1 × 1 | 1 × 1 | 1 × 1 | 1 × 1 | — | — | — |
| pooling size | 2 × 2 | 2 × 2 | — | — | 2 × 2 | — | — | — |
| pooling stride | 2 × 2 | 2 × 2 | — | — | 2 × 2 | — | — | — |
| 0-pad size | — | — | 1 × 1 × 1 × 1 | 1 × 1 × 1 × 1 | 1 × 1 × 1 × 1 | — | — | — |
| Spatial input size | 231 × 231 | 28 × 28 | 12 × 12 | 12 × 12 | 12 × 12 | 6 × 6 | 1 × 1 | 1 × 1 |

| Downscaled CNN | | | | | | | | |
|---|---|---|---|---|---|---|---|---|
| layer | 120(1) | 120(2) | 120(3) | 120(4) | 120(5) | 150(1) | 150(2) | 150(3) |
| type | Conv + max-p | Conv + max-p | Conv | Conv | Conv + max-p | Fully-conn | Fully-conn | Fully-conn |
| output channels | 96 | 256 | 512 | 1024 | 1024 | 3072 | 4096 | 1000 |
| kernel size | 7 × 7 | 3 × 3 | 2 × 2 | 2 × 2 | 2 × 2 | — | — | — |
| cony stride | 4 × 4 | 1 × 1 | 1 × 1 | 1 × 1 | 1 × 1 | — | — | — |
| pooling size | 2 × 2 | 2 × 2 | — | — | 2 × 2 | — | — | — |
| pooling stride | 2 × 2 | 2 × 2 | — | — | 2 × 2 | — | — | — |
| 0-pad size | — | — | 1 × 1 × 1 × 1 | 1 × 1 × 1 × 1 | 1 × 1 × 1 × 1 | — | — | — |
| spatial input size | 147 × 147 | 18 × 18 | 8 × 8 | 9 × 9 | 10 × 10 | 4 × 4 | 1 × 1 | 1 × 1 | wherein:
- output channels: is the number of kernels of the layer, which is also equal to the number of channels of the output structure generated in the layer,
- kernel size is the size R of the kernel of the layer;
- cony stride is the step size used for moving the kernel over the input structure of the layer for calculating the convolution;
- pooling size is the resolution of a max-pooling window used for generating a subsampled version of the output structure generated in the layer;
- pooling stride is the step size used for moving the max-pooling window over the output structure generated in the layer,
- 0-pad size is the size of zero-padding applied to each side of the input structure border before calculating the convolution for the layer;
- spatial Input size is the resolution of the output structure of the layer (before applying the zero-padding.

The exemplary CNN has been trained for 110 epochs, using the downscaled version for the first 20 epochs, and then the original size version for the remaining epochs, by using the following learning rate parameters η.

| Epochs | learning rate parameter η |
|---|---|
| 1 to 18 | $1e^{-2}$ |
| 19 to 29 | $5e^{-3}$ |
| 30 to 43 | $1e^{-3}$ |
| 44 to 52 | $5e^{-4}$ |
| 53 to 110 | $1e^{-4}$ |

Using these data, a 58% of object classification accuracy has been measured after a training period (20 epochs of pre-training with downscaled version followed by 90 epochs of main-training with original size version) of 148.6 hours. Without the pre-training exploiting downscaled versions, the same object classification accuracy has been measured after 295.4 hours.

The previous description presents and discusses in detail several embodiments of the present invention; nevertheless, several changes to the described embodiments, as well as different invention embodiments are possible, without departing from the scope defined by the appended claims.

For example, although in the present description reference has been explicitly made to CNNs used for classifying images, the concepts of the present invention may be directly applied to CNNs directed to process generic signals, such as image signals, audio signals, or video signals. In this case, the input of the CNN, as well as the generic structures managed by the CNN are data structures whose elements corresponds to samples of such signals.

The invention claimed is:

1. A method comprising:
   a) implementing a convolutional neural network in a processing circuit, the convolutional neural network configured to receive an input data structure comprising a group of values corresponding to signal samples and to generate a corresponding classification output indicative of a selected one among a plurality of predefined classes, wherein the convolutional neural network comprises an ordered sequence of layers, each layer of the sequence configured to receive a corresponding layer input data structure comprising a group of input values, and generate a corresponding layer output data structure comprising a group of output values by convolving the layer input data structure with at least one corresponding filter comprising a corresponding group of weights, the layer input data structure of the first layer of the sequence corresponding to the input data structure, and the layer input data structure of a generic layer of the sequence different from the first layer corresponding to the layer output data structure generated by the previous layer in the sequence; and
   b) training the convolutional neural network to update the weights of the filters of the layers by exploiting a training set of training input data structures belonging to known predefined classes, the training comprising:
      b1) generating a modified convolutional neural network by downscaling, for at least one layer of the sequence of layers of the convolutional neural network, the at least one corresponding filter of the at least one layer of the sequence of layers of the convolutional neural network to obtain a downscaled filter of the at least one layer of the sequence of layers of the convolutional neural network comprising a reduced number of weights relative to the at least one corresponding filter of the at least one layer of the sequence of layers of the convolutional neural network;
      b2) downscaling the training input data structures to obtain corresponding downscaled training input data structures comprising a reduced number of values;
      b3) for each downscaled training input data structure of at least a subset of the training set, providing such downscaled training input data structure to the modified convolutional neural network to generate a corresponding classification output, and comparing the classification output with the predefined class to which the training input data structure corresponding to the downscaled training input data structure belongs; and
      b4) updating the weights of the filters of the layers based on the comparisons.

2. The method of claim 1, wherein the b) training the convolutional neural network further comprises:
   b5) reiterating for a first number of times the sequence of b3) and b4);
   b6) generating a further modified convolutional neural network by upscaling the downscaled filters to obtain upscaled filters comprising an increased number of weights;
   b7) for each training input data structure of at least a subset of the training set, providing such training input data structure to the further modified convolutional neural network to generate a corresponding classification output, and comparing the classification output with the predefined class to which the training input data structure belongs; and
   b8) updating the weights of the filters of the layers based on the comparisons.

3. The method of claim 2, wherein the b) training the convolutional neural network further comprises b9) reiterating for a second number of times the sequence of b7) and b8).

4. The method of claim 1, wherein:
   the input data structure and each training input data structure comprise at least one respective data structure channel, each data structure channel comprising a corresponding matrix arrangement of a first number of values;
   each filter of a layer comprises a set of filter channels, each filter channel of the set being associated with a corresponding data structure channel of the corresponding layer input data structure, each filter channel comprising a corresponding matrix arrangement of a first number of weights; and
   the b2) downscaling the at least on filter of a layer to obtain a downscaled filter comprises generating a reduced matrix arrangement of weights comprising a second number of weights lower than the first number of weights.

5. The method of claim 4, wherein the b2) downscaling a training input data structure to obtain a corresponding downscaled training input data structure comprises generating for each data structure channel a reduced matrix arrangement of values comprising a second number of values lower than the first number of values.

6. The method of claim 1, wherein the input data structure and the training input data structures are digital images comprising a plurality of pixels, each value of the group of values depending on a corresponding pixel of the plurality.

7. The method of claim 1, further comprising, after the convolutional neural network has been trained:
   c) storing last updated weights in a weight database;
   d) at a user device, sending an input data structure to a classification server;
   e) at the classification server, retrieving the last updated weights from the weight database and setting the convolutional neural network with the retrieved weights;
   f) at the classification server, providing the input data structure received from the user device to the convolutional neural network to obtain a corresponding classification output; and
   g) at the classification network, sending the obtained classification output to the user device.

8. The method of claim 1,
   wherein the convolutional neural network further comprises a further ordered sequence of fully-connected layers, each fully-connected layer of the further sequence being configured to receive a corresponding further layer input data structure comprising a group of further input values, and generate a corresponding further layer output data structure comprising a group of further output values, and
   wherein each further output value of the further layer output data structure is a function of all the input values of the further layer input data structure.

9. The method of claim 1, wherein at least one layer of the sequence is followed by a corresponding still further layer, the still further layer being configured to generate a subsampled version of the layer output data structure generated by the at least one layer.

10. A convolutional neural network training system, comprising:

a training device configured to:

implement a convolutional neural network configured to receive an input data structure comprising a group of values corresponding to signal samples and to generate a corresponding classification output indicative of a selected one among a plurality of predefined classes, wherein the convolutional neural network comprises an ordered sequence of layers, each layer of the sequence configured to receive a corresponding layer input data structure comprising a group of input values, and generate a corresponding layer output data structure comprising a group of output values by convolving the layer input data structure with at least one corresponding filter comprising a corresponding group of weights, the layer input data structure of the first layer of the sequence corresponding to the input data structure, and the layer input data structure of a generic layer of the sequence different from the first layer corresponding to the layer output data structure generated by the previous layer in the sequence, and generate a modified convolutional neural network by downscaling, for at least one layer of the sequence of layers of the convolutional neural network, the at least one corresponding filter of the at least one layer of the sequence of layers of the convolutional neural network to obtain a downscaled filter of the at least one layer of the sequence of layers of the convolutional neural network comprising a reduced number of the weights relative to the at least one corresponding filter of the at least one layer of the sequence of layers of the convolutional neural network;

a training database storing a training set of training input data structures belonging to known predefined classes, wherein the training device is further configured to downscale the training input data structures to obtain corresponding downscaled training input data structures comprising a reduced number of values;

a calculation device configured to provide, for each downscaled training input data structure of at least a subset of the training set, such downscaled training input data structure to the modified convolutional neural network to generate a corresponding classification output, and comparing the classification output with the predefined class to which the training input data structure corresponding to the downscaled training input data structure belongs; and a weight database adapted to store the weights of the filters of the layers, the training device being further configured to update the weights of the filters of the layers stored in the weight database based on the comparisons.

11. The method of claim 1, wherein the at least one corresponding filter of the at least one layer of the sequence of layers of the convolutional neural network is downscaled based upon a scaling factor.

12. The method of claim 1, wherein the training input data structures are downscaled based upon a scaling factor.

13. The method of claim 1, wherein the at least one corresponding filter of the at least one layer of the sequence of layers of the convolutional neural network is downscaled and the training input data structures are downscaled based upon a common scaling factor.

14. The method of claim 3, wherein the second number of times is different from the first number of times.

15. The method of claim 14, wherein the second number of times is greater than the first number of times.

* * * * *